US009572208B2

(12) United States Patent
Melanson

(10) Patent No.: US 9,572,208 B2
(45) Date of Patent: *Feb. 14, 2017

(54) LED LIGHTING SYSTEM WITH ACCURATE CURRENT CONTROL

(71) Applicant: KONINKLIJKE PHILIPS N.V., Eindhoven (NL)

(72) Inventor: John L. Melanson, Austin, TX (US)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 57 days.

This patent is subject to a terminal disclaimer.

(21) Appl. No.: 14/261,096

(22) Filed: Apr. 24, 2014

(65) Prior Publication Data
US 2015/0312982 A1    Oct. 29, 2015

Related U.S. Application Data

(63) Continuation of application No. 13/942,220, filed on Jul. 15, 2013, now Pat. No. 8,742,684, which is a continuation of application No. 12/339,651, filed on Dec. 19, 2008, now Pat. No. 8,487,546.

(60) Provisional application No. 61/092,842, filed on Aug. 29, 2008.

(51) Int. Cl.
| | | |
|---|---|---|
| H05B 37/02 | (2006.01) |
| H02M 3/157 | (2006.01) |
| H05B 41/28 | (2006.01) |
| H05B 33/08 | (2006.01) |

(52) U.S. Cl.
CPC ...... *H05B 33/0815* (2013.01); *H05B 33/0848* (2013.01); *Y02B 20/347* (2013.01)

(58) Field of Classification Search
CPC ..... H05B 37/02; H05B 33/0815; H05B 41/28; H02M 3/157; H02M 1/0845; H02M 1/4225; H02M 2001/007; H02M 2001/008; H02M 3/155; H02M 3/156
USPC ............ 315/291, 209 R, 294, 297, 309, 312; 323/282
See application file for complete search history.

(56) References Cited

U.S. PATENT DOCUMENTS

| | | | | |
|---|---|---|---|---|
| 2004/0239262 | A1* | 12/2004 | Ido et al. | ......... 315/291 |
| 2005/0122057 | A1* | 6/2005 | Chen | ....... H05B 41/3924 315/224 |
| 2005/0231133 | A1* | 10/2005 | Lys | ............. 315/291 |
| 2007/0182347 | A1* | 8/2007 | Shteynberg | ..... H05B 33/0815 315/312 |
| 2013/0215399 | A1* | 8/2013 | Suzuki | ............ 353/85 |

* cited by examiner

*Primary Examiner* — Douglas W Owens
*Assistant Examiner* — Wei Chan

(57) ABSTRACT

A light emitting diode (LED) lighting system and method are disclosed. The LED lighting system and method include an LED controller to accurately control a current in an LED system. The LED controller includes components to calculate, based on the current and an active time period of an LED current time period, an actual charge amount delivered to the LED system wherein the LED current time period is duty cycle modulated at a rate of greater than fifty (50) Hz and to utilize the actual charge amount to modify and provide a desired target charge amount to be delivered during a future active time period of the LED current time period. The LED system and method further involve components to compare the actual charge amount to a desired charge amount for the active time period and compensate for a difference between the actual charge amount and the desired charge amount during the future active time period.

21 Claims, 9 Drawing Sheets

LED LIGHTING SYSTEM WITH ACCURATE CURRENT CONTROL

CROSS REFERENCE TO RELATED APPLICATIONS

U.S. Provisional Application No. 60/909,458, entitled "Ballast for Light Emitting Diode Light Sources," inventor John L. Melanson, and filed on Apr. 1, 2007 describes exemplary methods and systems and is incorporated by reference in its entirety. Referred to herein as "Melanson I".

U.S. patent application Ser. No. 12/047,249, entitled "Ballast for Light Emitting Diode Light Sources," inventor John L. Melanson, and filed on Mar. 12, 2008 describes exemplary methods and systems and is incorporated by reference in its entirety. Referred to herein as "Melanson II".

U.S. patent application Ser. No. 12/047,269, entitled "Lighting System with Power Factor Correction Control Data Determined from a Phase Modulated Signal," inventor John L. Melanson, and filed on Mar. 12, 2008 describes exemplary methods and systems and is incorporated by reference in its entirety. Referred to herein as "Melanson III".

U.S. patent application Ser. No. 11/695,024, entitled "Lighting System with Lighting Dimmer Output Mapping," inventors John L. Melanson and John Paulos, and filed on Apr. 1, 2007 describes exemplary methods and systems and is incorporated by reference in its entirely. Referred to herein as "Melanson IV".

U.S. patent application Ser. No. 11/864,366, entitled "Time-Based Control of a System having Integration Response," inventor John L. Melanson, and filed on Sep. 28, 2007 describes exemplary methods and systems and is incorporated by reference in its entirety. Referred to herein as Melanson V.

U.S. patent application Ser. No. 11/967,269, entitled "Power Control System Using a Nonlinear Delta-Sigma Modulator with Nonlinear Power Conversion Process Modeling," inventor John L. Melanson, and filed on Dec. 31, 2007 describes exemplary methods and systems and is incorporated by reference in its entirety. Referred to herein as Melanson VI.

U.S. patent application Ser. No. 11/967,271, entitled "Power Factor Correction Controller with Feedback Reduction," inventor John L. Melanson, and filed on Dec. 31, 2007 describes exemplary methods and systems and is incorporated by reference in its entirety. Referred to herein as Melanson VII.

U.S. patent application Ser. No. 11/967,273, entitled "System and Method with Inductor Flyback Detection Using Switch Gate Charge Characteristic Detection," inventor John L. Melanson, and filed on Dec. 31, 2007 describes exemplary methods and systems and is incorporated by reference in its entirety. Referred to herein as Melanson VIII.

U.S. patent application Ser. No. 11/967,275, entitled "Programmable Power Control System," inventor John L. Melanson, and filed on Dec. 31, 2007 describes exemplary methods and systems and is incorporated by reference in its entirety. Referred to herein as Melanson IX.

U.S. patent application Ser. No. 11/967,272, entitled "Power Factor Correction Controller With Switch Node Feedback", inventor John L. Melanson, and filed on Dec. 31, 2007 describes exemplary methods and systems and is incorporated by reference in its entirety. Referred to herein as Melanson X.

U.S. patent application Ser. No. 12/058,971, entitled "LED Lighting System with a Multiple Mode Current Control Dimming Strategy", inventor John L. Melanson, and filed on Mar. 31, 2008 describes exemplary methods and systems and is incorporated by reference in its entirety. Referred to herein as Melanson XI.

BACKGROUND OF THE INVENTION

Field of the Invention

The present invention relates in general to the field of electronics and lighting, and, more specifically, to a light emitting diode (LED) system and method with accurate current control.

Description of the Related Art

Commercially practical incandescent light bulbs have been available for over 100 years. However, other light sources show promise as commercially viable alternatives to the incandescent light bulb. LEDs are becoming particularly attractive as main stream light sources in part because of energy savings through high efficiency light output and environmental incentives such as the reduction of mercury.

LEDs are semiconductor devices and are driven by direct current. The lumen output intensity (i.e. brightness) of the LED approximately varies in direct proportion to the current flowing through the LED. Thus, increasing current supplied to an LED increases the intensity of the LED and decreasing current supplied to the LED dims the LED, i.e. decreases the brightness of the LED. Current can be modified by either directly reducing the direct current level to the white LEDs or by reducing the average current through duty cycle modulation.

Dimming a light source saves energy when operating a light source and also allows a user to adjust the intensity of the light source to a desired level. Many facilities, such as homes and buildings, include light source dimming circuits (referred to herein as "dimmers").

FIG. 1 depicts an LED lighting system 100 that supplies power to light emitting diodes (LEDs) 102 and dims the LEDs 102 in accordance with a dimming level indicated by the phase modulated signal $V_\Phi$. The voltage source 104 supplies an alternating current (AC) input voltage $V_{IN}$. Full, diode bridge rectifier 108 rectifies the input voltage $V_{IN}$. The mains voltage source 104 is, for example, a public utility, and the input voltage $V_{DIM}$ is, for example, a 60 Hz/120 V rectified voltage in the United States of America or a 50 Hz/230 V rectified voltage in Europe. The dimmer 106 is, for example, a phase cut dimmer that generates phase delays in the rectified input voltage $V_{IN}$ to generate phase modulated signal $V_\Phi$. The phase delays indicate dimming levels. Generally, as the phase delays increase, the dimming level decreases, i.e. as the phase delays increase, the dimming level indicates a lower brightness level for LEDs 102. The Background sections of Melanson I, Melanson II, and Melanson III, describe examples of dimmer 106.

Switching power supply 110 utilizes switching power converter technology to convert the phase modulated signal $V_\Phi$ into an output voltage $V_{OUT}$. The output voltage $V_{OUT}$ is sufficient to bias the LEDs 102. Switching power supply 110 also supplies an LED current $i_{LED}$ to illuminate the LEDs 102.

Current controller 112 controls active and average values of LED current $i_{LED}$ by controlling the conductivity of n-channel field effect transistor (FET) Q1. Current controller 112 generates a gale control signal $C_{G0}$ to charge and discharge a gate of FET Q1. The control signal $C_{G0}$ has two relevant frequencies, an active frequency and a duty cycle modulated frequency. During an active period of LED current $i_{LED}$, the control signal $C_{G0}$ has an active frequency in the range of, for example, 20 kHz to 500 kHz. As described subsequently in more detail, the duty cycle modulated frequency is less than the active frequency. The active period of LED current $i_{LED}$ is the period of time when the average value of LED current $i_{LED}$ equals current value $i_{FULL}$. The time period for this average is, for example, one or a few (such as 3-5) periods of the active frequency.

When the control signal $C_{G0}$ is a logical "one", FET Q1 conducts, i.e. is "ON", and when the control signal $C_{G0}$ is a logical "zero", FET Q1 is nonconductive, i.e. is "OFF". When the FET Q1 is "ON", diode D1 is reversed bias and, LED current $i_{LED}$ flows through the LEDs 102 and charges inductor $L_1$. When FET Q1 is "OFF", the voltage across inductor $L_1$ changes polarity, and diode $D_1$ creates a current path for the LED current $i_{LED}$. The inductor $L_1$ is chosen so as to store enough energy to maintain an approximately constant active value of LED current $i_{LED}$ when MOSFET Q1 is "OFF". Capacitor C1 helps "smooth" LED current $i_{LED}$. As subsequently explained in more detail, the active value of the LED current $i_{LED}$ is the average LED current $i_{LED}$ when the current control system 112 is active, i.e. during the active period of LED current $i_{LED}$. The LED current $i_{LED}$ includes a ripple 201 due to, for example, the charging and discharging of inductor L1. The frequency of the ripple 201 is the active frequency. It is desirable, for LED efficiency, to keep the LED current relatively constant, to reduce heating effects.

FIG. 2 depicts a graphical representation 200 of the LED current $i_{LED}$ for various dimming levels indicated by the phase modulated signal $V_\Phi$. Referring to FIGS. 1 and 2, when the phase modulated signal $V_\Phi$ indicates a full dimming level, i.e. full brightness for LEDs 102, current controller 112 controls the LED current $i_{LED}$ so that the active value of LED current $i_{LED}$ is continuous and constant over time and equals $i_{FULL}$, as indicated by LED current $i_{LED}$ waveform 202. "$i_{FULL}$" represents the active value of LED current $i_{LED}$ that causes the LEDs 102 to illuminate at full brightness.

The current controller 112 uses feedback information from feedback signal $LEDi_{sense}$ to sense the active value of LED current $i_{LED}$. The feedback signal $LEDi_{sense}$ represents a voltage $V_{fb}$ across sense resistor $R_{SENSE}$. The voltage $V_{fb}$ represents LED current $i_{LED}$ when FET Q1 is ON. Thus, from the feedback signal $LEDi_{sense}$, the current controller 112 obtains the value of LED current $i_{LED}$ and can adjust the duty cycle of control signal $C_{G0\_FULL}$ to maintain the active value of LED current $i_{LED}$ at the full active value $i_{FULL}$ during the active period of LED current $i_{LED}$. As subsequently explained in more detail, the control signal $C_{G0\_FULL}$ is also duty cycle modulated at the duty cycle modulation frequency in response to dimming levels indicated by phase modulated signal $V_\Phi$ to generate control signal $C_{G0}$.

To determine the dimming level indicated by phase modulated signal $V_\Phi$, comparator 114 compares the phase modulated signal $V_\Phi$ with a phase delay detection reference signal $V_{DET}$. The value of phase delay detection reference signal $V_{DET}$ is set to detect an edge of any phase delays in the phase modulated signal $V_\Phi$. Generally, the edge of any phase delays during each cycle of phase modulated signal $V_\Phi$ results in a voltage increase in phase modulated signal $V_\Phi$. Thus, generally, the value of phase delay detection reference signal $V_{DET}$ is set low enough, so that the output of comparator 114 changes from a logical 0 to a logical 1 when a rising edge associated with an end to a phase delay is detected and changes to a logical 0 if a phase delay is detected during a cycle of phase modulated signal $V_\Phi$.

Comparator 114 generates a duty cycle modulated enable signal EN at the duty cycle modulation frequency. The duty cycle of enable signal EN corresponds to the dimming level indicated by phase modulated signal $V_\Phi$. The current controller 112 responds to the enable signal EN by duty cycle modulating the control signal $C_{G0}$ so that the average value, $i_{LED\_AVG}$, of LED current $i_{LED}$ varies in accordance with dimming levels indicated by the phase modulated signal $V_\Phi$. Modulator 116 represents a logical representation of utilizing the enable signal EN to generate a duty cycle modulated control signal $C_{G0}$. The enable signal EN represents one input signal to AND gate 118, and control signal $C_{G0\_FULL}$ represents another input signal to AND gate 118. The AND gate 118 is exemplary. In typical applications, the function of the AND gate 118 is integrated into the logic of the controller 112. Control signal $C_{G0\_FULL}$ corresponds to control signal $C_{G0}$ during the active period of LED current $i_{LED}$. When the enable signal EN is a logical 1, the control signal $C_{G0}$ equals the control signal $C_{G0\_FULL}$. When the enable signal EN is a logical 0, the control signal $C_{G0}$ equals 0. Thus, the control signal $C_{G0}$ is duty cycle modulated to generate the control signal $C_{G0\_FULL}$ and is duty cycle modulated in response to the phase modulated signal $V_\Phi$.

For example, referring to LED current $i_{LED}$ waveform 204, when the phase modulated signal $V_\Phi$ indicates a ¾ dimming level, the duty cycle of enable signal EN is 0.75. The enable signal EN causes the current controller 112 to duty cycle modulate the control signal $C_{G0}$ with the same duty cycle as enable signal EN so that time period $T_{ACTIVE\_3/4}/T$ equals 0.75. Thus, the active period of LED current $i_{LED}$ equals $T_{ACTIVE\_3/4}$ for each period T of phase modulated signal $V_\Phi$ while the phase modulated signal $V_\Phi$ indicates a ¾ dimming level. Period T represents a duty cycle modulated period, and the duty cycle modulated frequency equals 1/T. The average LED current $i_{LED\_AVG}$ equals $i_{FULL}$ (the active value of LED current $i_{LED}$) times the duty cycle of enable signal EN. For a ¾ dimming level, the average LED current $i_{LED\_AVG}$ equals $0.75 \cdot i_{FULL}$. During the inactive period of LED current $i_{LED}$, i.e. between the end of the active period $T_{ACTIVE\_3/4}$ and the beginning of the next period of phase modulated signal $V_\Phi$, the LED current $i_{LED}$ is zero.

Referring to LED current $i_{LED}$ waveform 206, when the phase modulated signal $V_\Phi$ indicates a ⅛ dimming level, the duty cycle of enable signal EN is 0.125. The enable signal EN causes the current controller 112 to duty cycle modulate the control signal $C_{G0}$ with the same duty cycle as enable signal EN so that time period $T_{ACTIVE\_1/8}/T$ equals 0.125. Thus, the active period of LED current $i_{LED}$ equals $T_{ACTIVE\_1/8}$ for each period T of phase modulated signal $V_\Phi$ while the phase modulated signal $V_\Phi$ indicates a ⅛ dimming level. The average LED current $i_{LED\_AVG}$ equals $i_{FULL}$ times the duty cycle of enable signal EN. For a ⅛ dimming level, the average LED current $i_{LED\_AVG}$ equals $0.125 \cdot i_{FULL}$. During the inactive period of LED current $i_{LED}$, i.e. between the end of the active period $T_{ACTIVE\_1/8}$ and the beginning of the next period of phase modulated signal $V_\Phi$, the LED current $i_{LED}$ is zero.

Dimmable LED systems are typically driven with a Pulse Width Modulation (PWM) controlling a constant-current source, and the PWM duty cycle is modified to select the dimming level. The constant current source is either linear or a switch-mode controller. For most high powered LED applications, such as general lighting, system efficiency is a critical characteristic, and a switch-mode controller is used. The switching frequency $f_{SW}$ of the controller is typically in the range of 20 kHz to 1+ MHz. Examples of switch mode controllers would be the Sipex Corporation SP6652 and the National Instruments LM3407. The datasheets for Sipex Corporation SP6652 and National Instruments LM3407 respectively dated May 25, 2007 and Jan. 18, 2008 are hereby incorporated by reference.

Referring now to FIG. 3, an exemplary plot 300 of an Enable signal EN, output voltage $V_{out}$, and LED current $I_{LED}$ against dimming voltage values is shown for the Sipex SP6652. Exemplary ramp-up 302 of an active period for LED current $I_{LED}$ is shown in plot 300. In FIG. 3, the voltage $V_{IN}$ is 4.2 Volts, $V_0$ is 3.3 Volts, $I_{out}$ is 600 mA, $R_{sense}$ equals 4 kohm, and $L_1$ equals 4.7 microH. Furthermore, referring now to FIG. 4, another exemplary plot 400 of an Enable signal EN, output voltage $V_{out}$, and LED current $I_{LED}$ against dimming voltage values is shown for the Sipex SP6652. Another exemplary ramp-up 402 of an active period for LED current $I_{LED}$ is shown in plot 400. In FIG. 4, the voltage $V_{IN}$ is 4.2 Volts, $V_0$ is 1.5 Volts, $I_{out}$ is 600 mA, $R_{sense}$ equals 4 kohm, and $L_1$ equals 4.7 microH. As shown in plots 300 and 400, the shape of LED current $I_{LED}$ is not controlled very well.

Referring now to FIG. 5, an exemplary plot 500 of Enable signal $V_{EN}$, output voltage $V_{LED}$, and LED current $I_{LED}$ against time is shown for the National Semiconductor LM3407. Specifically in plot 500, enabling of dimming is shown, and exemplary current ramp-up 502 of an active period for LED current $I_{LED}$ is shown. Referring now to FIG. 6, an exemplary plot 600 of Enable signal $V_{EN}$, output voltage $V_{LED}$, and LED current $I_{LED}$ against time is shown for the National Semiconductor LM3407. Specifically in plot 600, disabling of dimming is shown, and exemplary current ramp-down 602 of the same active period for LED current $I_{LED}$ as shown in plot 500 is shown.

The switch mode controllers (e.g., Sipex SP6652 and National Semiconductor LM3407) have an enable input signal (e.g., Enable signal EN or $V_{EN}$) that is pulsed for PWM operation. Ideally, a desired amount of charge for each active time period for LED current $I_{LED}$ is desired to be provided to the LED system. However, due to limitations of quantizing charge in discrete time, providing an ideal desired amount of charge for an active time period for LED current $I_{LED}$ to an LED system is very hard or impossible to achieve. Such non-idealities are in itself due to the nature of charge quantization (e.g., charge quantizing cycles). The inherent problem of quantizing cycles of charge is that it is limited to the exactness of the amount of charge of LED current $I_{LED}$ being provided to the LED system due to the fact that charge is quantized in discrete amounts based on discrete time. For example, the geometric points in time of when LED current $I_{LED}$ ramp-up (e.g., slope 502) and ramp-down (e.g., slope 602) and the cycle rate at which the LED current $I_{LED}$ fluctuates at an average peak current value in accordance with the values of pulses of a control signal limit the exactness of the amount of charge being provided. Also, temperature variations, power supply variations, LED aging, etc. also impact the accuracy of the amount of charge being delivered to an LED system.

Also, too slow of a PWM operation frequency (e.g., below 200 Hz) for pulsing the enable input signal can be perceived as a flicker of the LED of a dimmable LED lighting system. Furthermore, operation below a PWM frequency of 20 kHz for pulsing the enable input signal has the potential to create audio tones due to acoustic behavior of magnetic material, which is undesirable and can lead to higher cost to ameliorate the sound path.

On the other hand, an overly fast PWM operation frequency for pulsing the enable input signal runs into a problem with the start-up and shut down of the current controller. For example, it may take 0.1 milliseconds to 1 millisecond to turn on and off the current. At high PWM operation frequencies, many other negative effects that the dimmable LED lighting system may encounter are the non-uniform dimming control, unpredictable control, and non-linear behavior. In applications with multiple LED colors, the balance between a slow and fast PWM operation frequency is important to the resulting color, and these issues severely limit the ability to provide a desired resulting color.

There are also other modes of dimming that modify the intensity in ways other than by PWM operation that have desirable characteristics. One of the ways includes the use of delta-sigma modulation. However, the use of delta-sigma modulation would be impractical with the slow behavior of the controller. Thus, a control system that can operate linearly across wide dimming frequency ranges while maintaining high efficiency is desired and needed.

SUMMARY OF THE INVENTION

In one embodiment of the present invention, a light emitting diode (LED) lighting system includes an LED controller to control a current in an LED system. The LED controller includes components to calculate, based on the current and an active time period of an LED current time period, an actual charge amount delivered to the LED system and utilize the actual charge amount to modify and provide a desired target charge amount to be delivered during a future active time period of the LED current time period. The LED system can also have components to compare the actual charge amount to a desired charge amount for the active time period and compensate for a difference between the actual charge amount and the desired charge amount during the future active time period.

In another embodiment of the present invention, a method of controlling a current in an LED system of an LED lighting system is disclosed. The method includes calculating, based on the current and an active time period of an LED current time period, an actual charge amount delivered to the LED system and utilizing the actual charge amount to modify and provide a desired target charge amount to be delivered during a future active time period of the LED current time period. The method can further include comparing the actual charge amount to a desired target charge amount for the active time period and compensating for a difference between the actual charge amount and the desired charge amount during the future active time period.

In a further embodiment of the present invention, a current controller for controlling current to an LED system for an LED lighting system is disclosed. The current controller includes components for receiving a dimming level signal from a dimming controller and for controlling and providing, based on the dimming level signal, an amount of drive current for driving the LED system. The components are at least part of an LED controller to calculate, based on the current and an active time period of the LED current time period, an actual charge amount delivered to the LED system and to utilize the actual charge amount to modify and provide a desired target charge amount to be delivered during a future active time period of the LED current time period.

In a still further embodiment, a method for controlling current to an LED system for an LED lighting system is disclosed. The method includes receiving a dimming level signal from a dimming controller and controlling and providing, based on the dimming level signal, an amount of drive current for driving the LED system. The receiving and controlling and providing steps are at least part of an LED controller method to calculate, based on the current and an active time period of the LED current time period, an actual charge amount delivered to the LED system and to utilize the actual charge amount to modify and provide a desired target charge amount to be delivered during a future active time period of the LED current time period.

In yet another embodiment, a delta-sigma modulator dimming controller for controlling a dimming level of an LED system for an LED lighting system is disclosed. The delta-sigma modulator dimming controller includes components for receiving a dimming control signal and driving a dimming level signal to a current controller for providing a current for driving the LED system. The components are at least part of an LED controller to calculate, based on the current and an active time period of an LED current time period, an actual charge amount delivered to the LED system and to utilize the actual charge amount to modify and provide a desired target charge amount to be delivered during a future active time period of the LED current time period.

In still yet another embodiment, a method for controlling a dimming level of an LED system for an LED lighting system utilizing a delta sigma modulator is disclosed. The method includes receiving a dimming control signal and driving a dimming level signal to a current controller for providing a current for driving the LED system. The receiving and driving steps are at least part of an LED controller method to calculate, based on the current and an active time period of an LED current time period, an actual charge amount delivered to the LED system and to utilize the actual charge amount to modify and provide a desired target charge amount to be delivered during a future active time period of the LED current time period.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A light emitting diode (LED) lighting system includes an LED controller to accurately control a current in an LED system. The LED controller includes components to calculate, based on the current and an active time period of an LED current time period, an actual charge amount delivered to the LED system wherein the LED current time period is duty cycle modulated at a rate of greater than fifty (50) Hz and to utilize the actual charge amount to modify and provide a desired target charge amount to be delivered during a future active time period of the LED current time period. The LED system further has components to calculate for an active time period of the LED current time period an actual charge amount delivered to the LED system and also has components to compare the actual charge amount to a desired charge amount for the active time period of the LED current time period and compensate for a difference between the actual charge amount and the desired charge amount during the future active time period. By being able to accurately control the desired charge amount, the average LED current is better controlled, and thus, the light intensity of the LED(s) is more effectively controlled.

The accurate control and charge compensation of the LED current in this manner and in accordance with the principles of the present invention allows the LED lighting control system to operate linearly across wide dimming ranges while maintaining high efficiency. By accurately controlling and charge compensating the LED current, flicker caused by a slow PWM operation frequency (e.g., below 200 Hz) for pulsing the enable input signal can be avoided. Additionally, start-up and shut down problems caused by an overly fast PWM operation frequency for pulsing the enable input signal are also avoided by accurately calculating charge compensation for the LED current. Other negative effects caused by an overly fast PWM operation frequency, such as non-uniform dimming control, unpredictable control, and non-linear behavior, are also eliminated because of the accurate control and charge compensation of the LED current. By being able to accurately balance a slow and fast PWM operation frequency, the ability to provide a desired resulting LED color is no longer limited.

Figure 1:
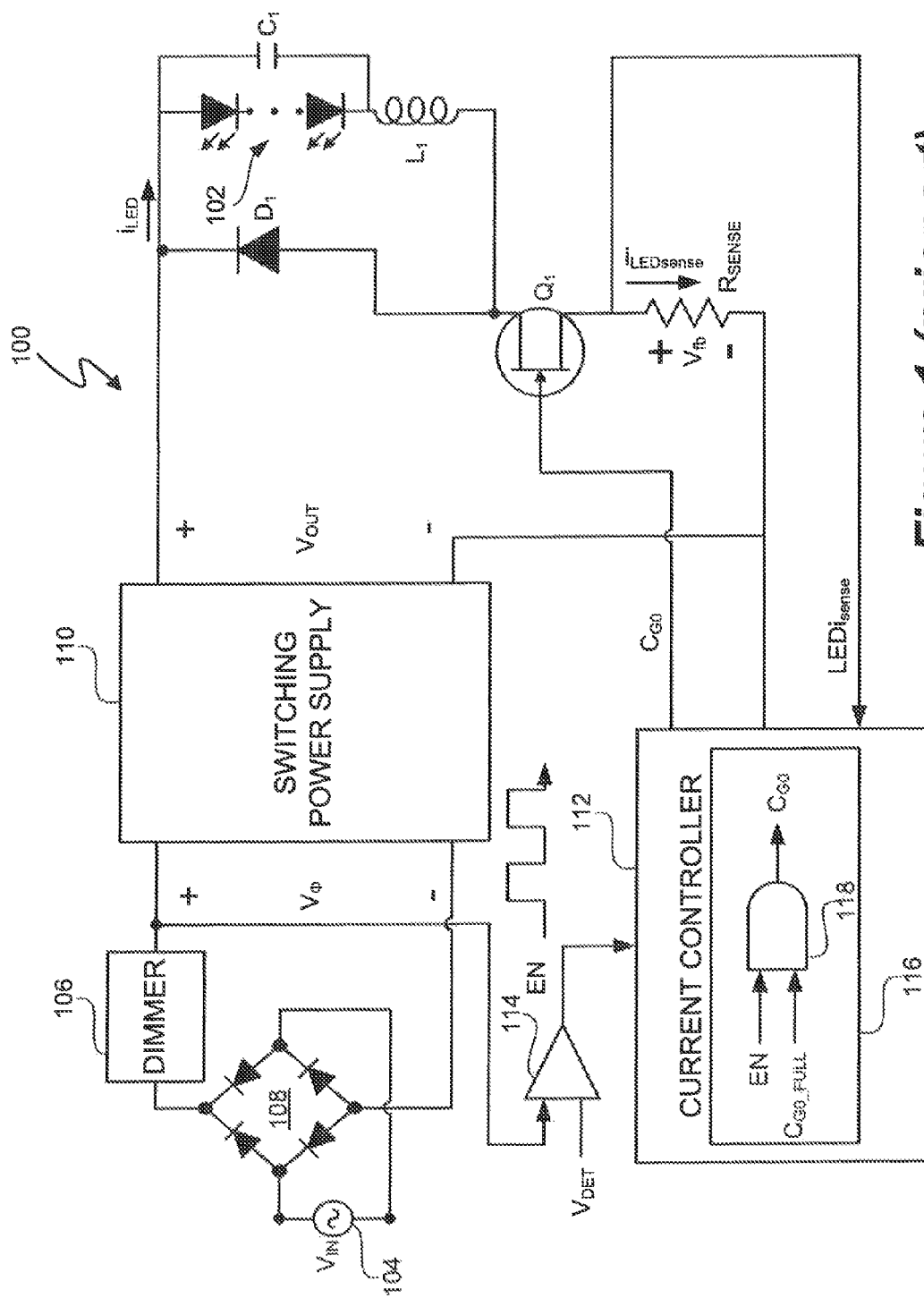
FIG. 1 (labeled prior art) depicts an LED lighting system.
Figure 2:
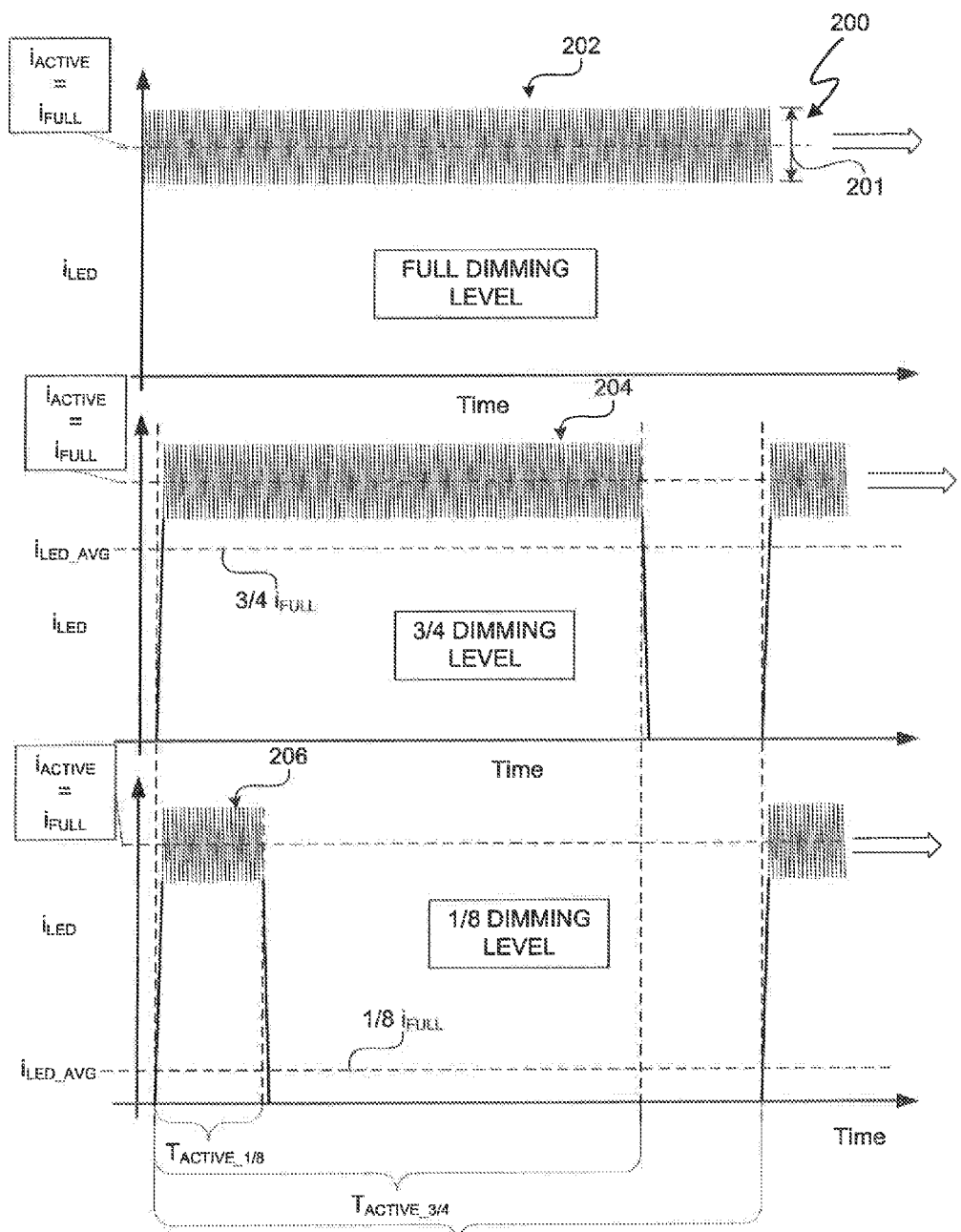
FIG. 2 (labeled prior art) depicts a graphical representation of LED current in the LED lighting system of FIG. 1 for various dimming levels.
Figure 3:
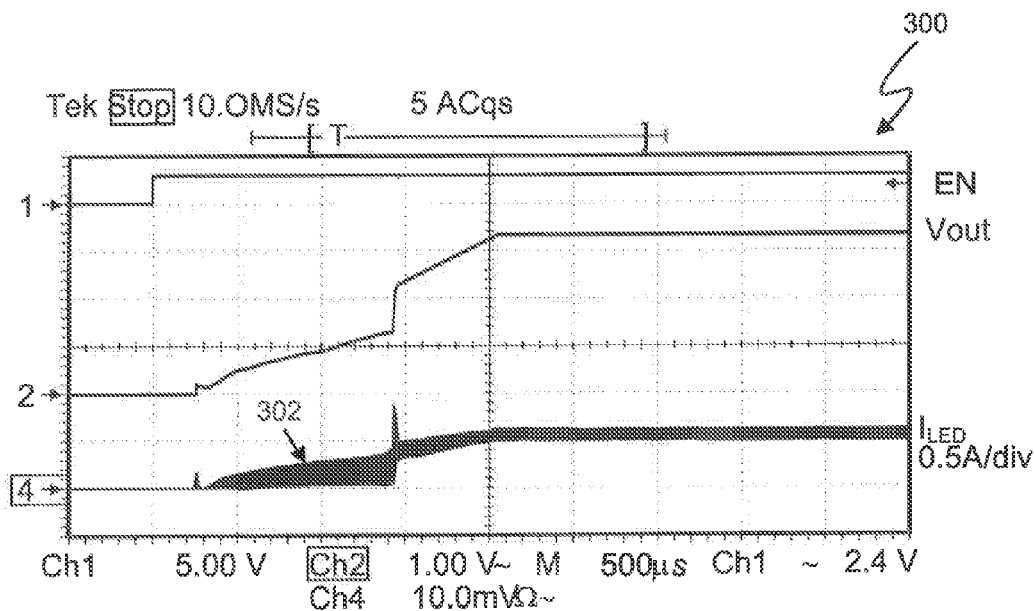
FIG. 3 (labeled prior art) depicts a graphical relationship between an enable signal, output voltage, and LED current plotted against dimming voltage values for a prior art LED switch mode controller.
Figure 4:
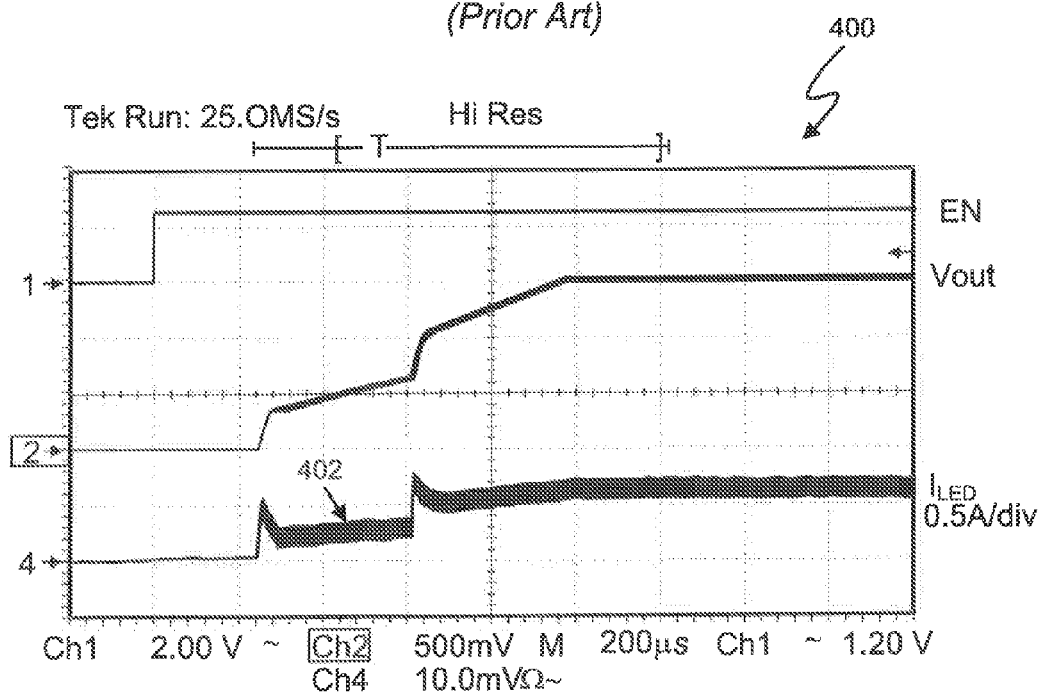
FIG. 4 (labeled prior art) depicts another graphical relationship between an enable signal, output voltage, and LED current plotted against dimming voltage values for a prior art LED switch mode controller.
Figure 5:
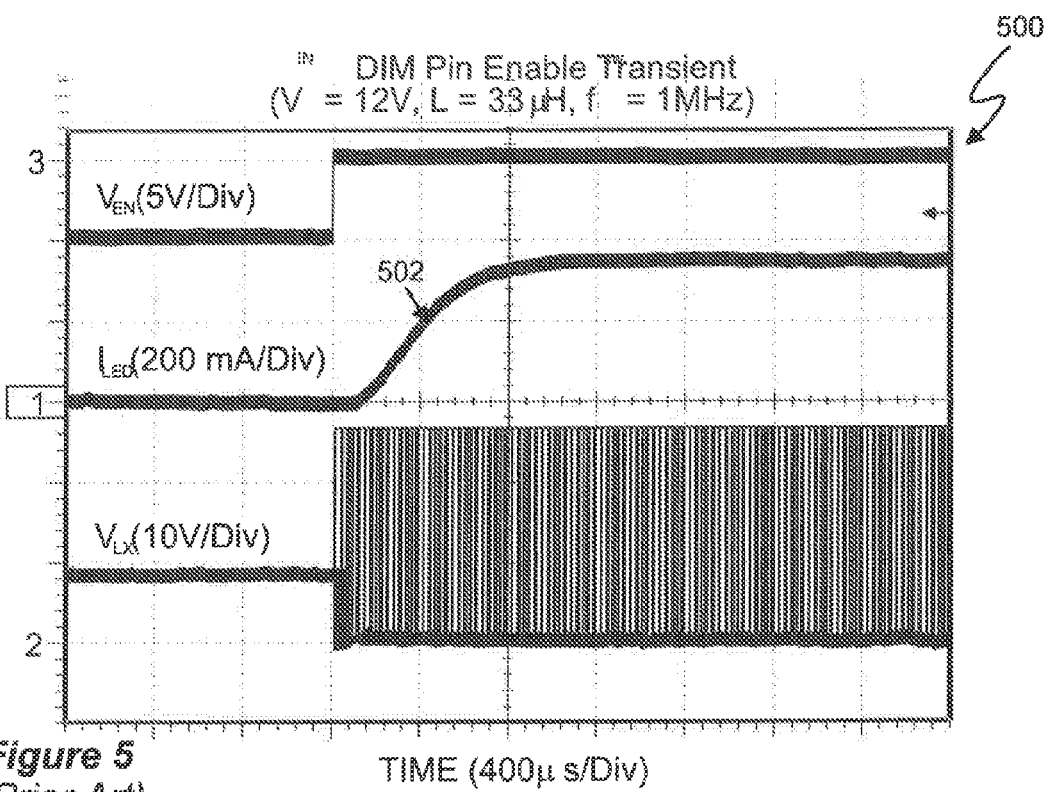
FIG. 5 (labeled prior art) depicts a graphical relationship between an enable signal, output voltage, and LED current plotted against time for another prior art LED switch mode controller showing the ramp-up of the LED current.
Figure 6:
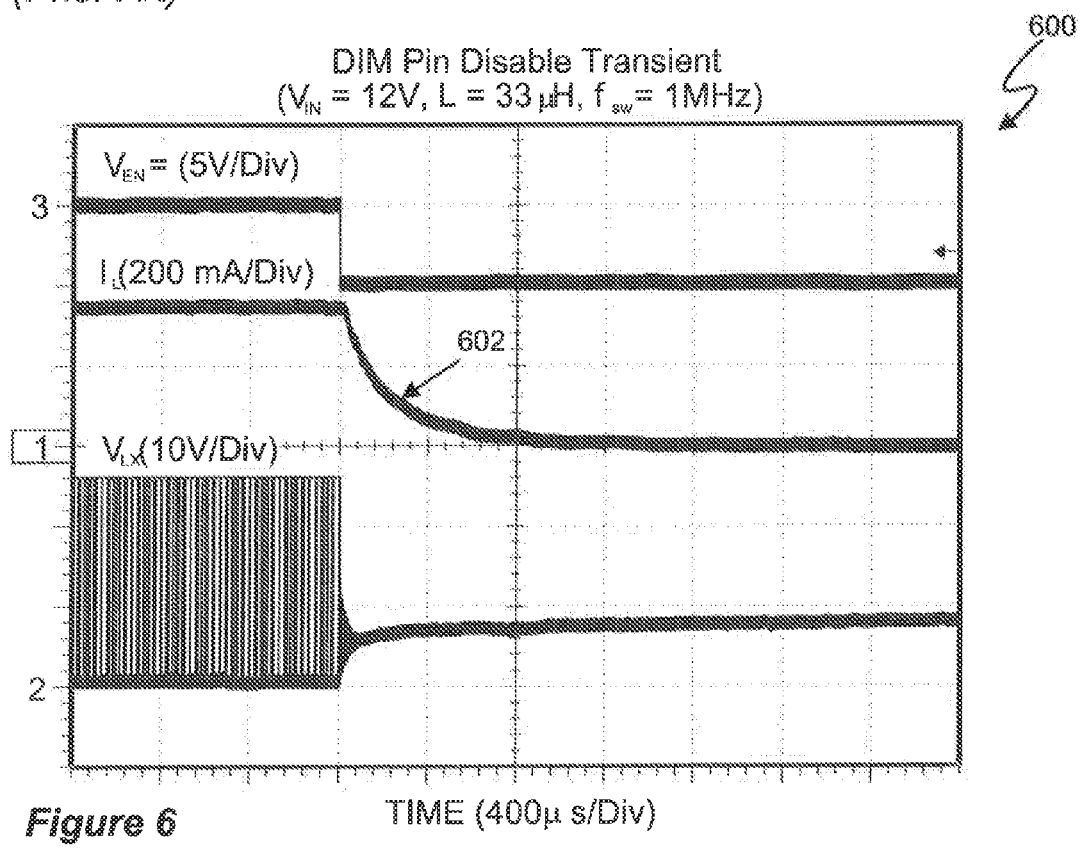
FIG. 6 (labeled prior art) depicts another graphical relationship between an enable signal, output voltage, and LED current plotted against time for the prior art LED switch mode controller which is the ramp-down of the LED current shown in FIG. 5.
Figure 7:
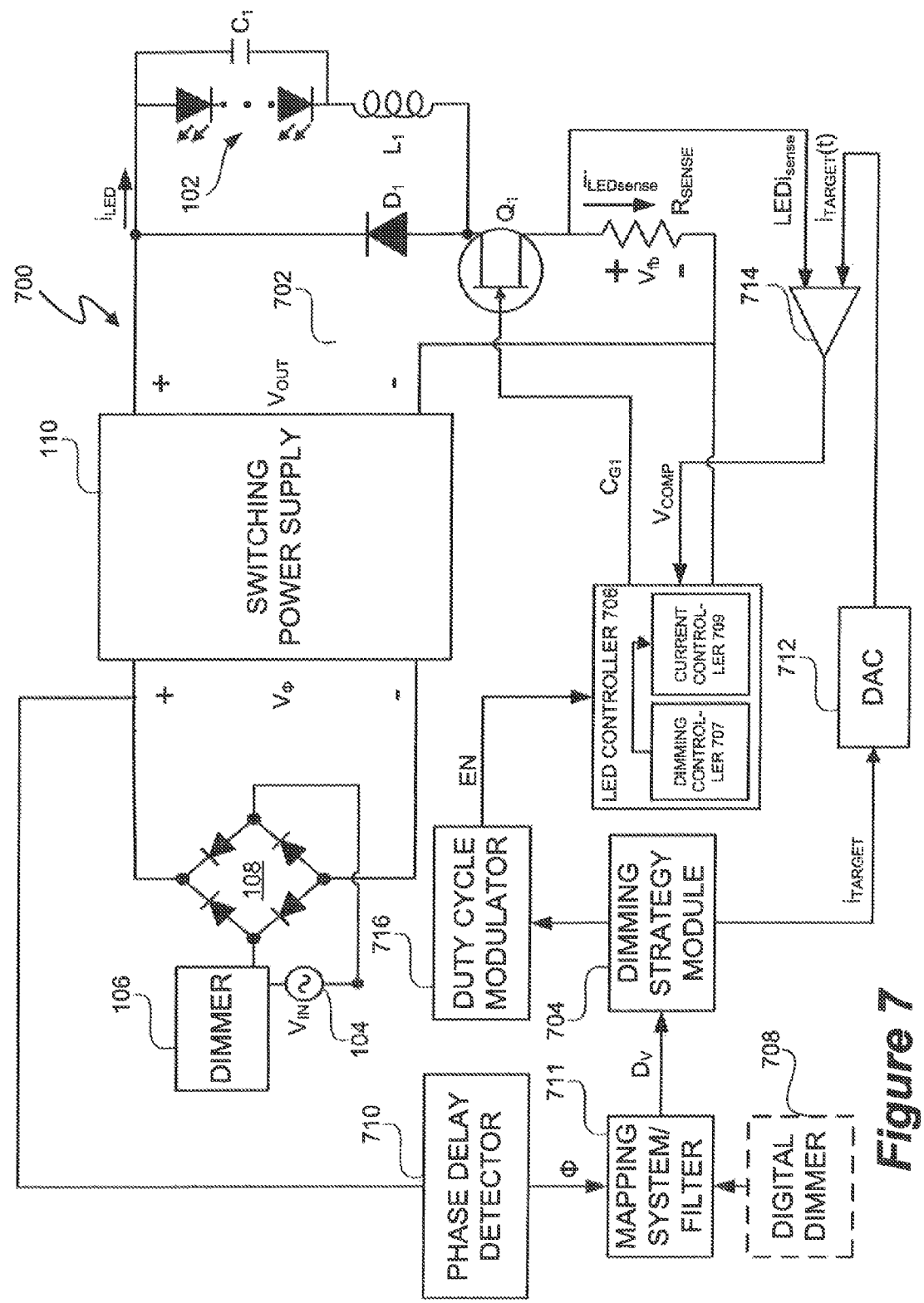
FIG. 7 depicts an LED lighting system having accurate current control in accordance with the present invention.

FIG. 7 depicts an LED lighting system 700 that includes a current control system 702 to control the LED current $i_{LED}$. The LED lighting system 700 also includes a dimming strategy module 704 to vary and modulate an active value of LED current $i_{LED}$ in response to varying dimming levels and in accordance with a dimming strategy described subsequently in more detail. In at least one embodiment, the LED lighting system 700 also includes the voltage source 104, dimmer 106, rectifier 108, and switching power supply 110, which operate as previously described.

The current control system 702 (shown in a dotted-line border) includes an LED controller 706 to generate a duty cycle modulated gate control signal $C_{G1}$ to control conductivity of FET Q1 and, thus, control LED current $i_{LED}$. LED controller 706 includes a dimming controller 707 and current controller 709. Dimming controller 707 drives current controller 709. Dimming controller 707 can be a pulse width modulation (PWM) dimming controller or a delta-sigma modulated dimming controller. Control signal $C_{G1}$ charges and discharges a gate of FET $Q_1$. A logical 1 value (e.g., a first state) of control signal $C_{G1}$ causes FET $Q_1$ to conduct and draw LED current $i_{LED}$ through an LED system that comprises a number of LEDs 102 and also through an inductor L1. A logical 0 value of control signal $C_{G1}$ causes FET Q1 to be non-conductive (e.g., a second state). FET $Q_1$ represents one embodiment of a switch and can be replaced by any type of switch.

In at least one embodiment, the LED lighting system 700 dims the LED system (e.g., the LEDs 102) in conformity with a dimming level input generated by a dimmer such as phase cut dimmer 106. The number of LEDs 102 is a matter of choice. LEDs 102 can be replaced by a single LED. The LED lighting system 700 can receive dimmer signals indicating dimming levels from LEDs 102 from any type of dimmer. For example, dimmer 106 can be omitted, and LED lighting system 700 can include a dimmer, such as digital dimmer 708 or a dimmer 106 having a direct current (DC) dimming control voltage (not shown). In at least one embodiment, the digital dimmer 708 is a digital addressable lighting interface (DALI) compatible dimmer. Digital dimmer 708 is depicted with "dashed" lines because generally LED lighting system 700 includes one dimmer or another dimmer but not two dimmers. Thus, in at least one embodiment, digital dimmer 708 is a substitute for dimmer 106 and phase delay detector 710. The dimmers, such as dimmer 106 and digital dimmer 708, receive inputs, either manually or automatically, that set the dimming level values to be output by the dimmers.

In at least one embodiment, the LED controller 706 responds to a dimming level input and generates the control signal $C_{G1}$ in accordance with a dimming strategy that, in at least one embodiment, includes two modes of operation. In an active value varying mode of operation, the LED controller 706 varies an active value of the LED current $i_{LED}$ in conformity with the dimming level for a first set of dimming levels. In an active value, duty cycle modulation mode of operation, the LED controller 706 modulates a duty cycle of an active value of the LED current it $i_{LED}$ in conformity with the dimming level for a second set of dimming levels.

To determine which of the two modes of operation is to be used in generating the LED current $i_{LED}$, LED lighting system 700 first detects a dimming level for LEDs 102. When LED lighting system 700 includes dimmer 106, the LED lighting system 700 also includes a phase delay detector 710 to detect phase delays in the phase modulated signal $V_\Phi$. The phase delay detector 710 generates a phase delay signal $\Phi$, and the phase delays represented by the digital phase delay signal $\Phi$ represent dimming levels. Melanson III describes an exemplary embodiment of phase delay detector 710.

In at least one embodiment, the LED lighting system 700 also includes an optional mapping system and filter 711 to map the dimming levels indicated by the phase delay signal $\Phi$ to predetermined digital values of dimming signal $D_V$. Melanson IV describes an exemplary mapping system and filter 711 that maps values of dimming signal $D_V$ to perceived light levels. The LED lighting system 700 receives the dimming signal $D_V$ as a dimming level input. In at least one embodiment, LED lighting system 700 omits the mapping system and filter 711, and the dimming strategy module 704 receives the phase delay signal $\Phi$ as a direct, digital dimmer signal input having values indicating dimming levels.

Figure 8:
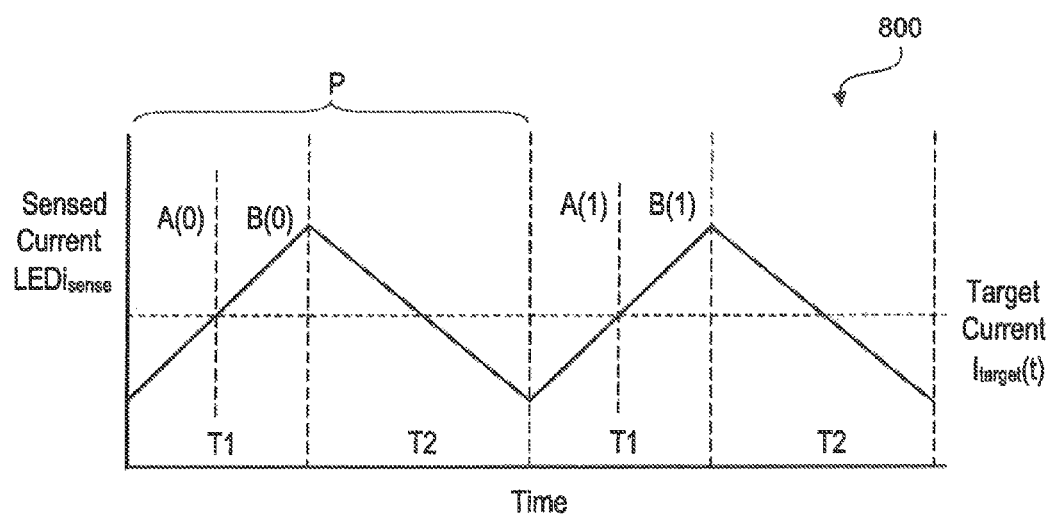
FIG. 8 depicts a timing diagram for the current controller of the controlled LED lighting system which implements the principles of the present invention.

FIG. 8 depicts an exemplary timing diagram for the dimming controller 707 and/or the current controller 709 of LED controller 706 within controlled LED lighting system 700. Dimming controller 707 and current controller 709 can each be implemented as a time-based controller that controls FET $Q_1$ such that the output voltage $V_{out}$ of controlled LED lighting system 700 has a desired average value. Because the control applied to FET $Q_1$ by time-based dimming controller 707 or time-based current controller 709 always causes controlled LED lighting system 700 to integrate up or down (e.g., integration response), time-based dimming controller 707 or time-based current controller 709 is said to apply bang-bang control.

As indicated by its name, time-based dimming controller or time-based current controller 709 implements a time-based control methodology, rather than one of the conventional magnitude-based control methodologies. Time-based dimming controller 707 or time-based current controller 709 receives a compared voltage $V_{COMP}$ which is a comparison of sensed signal $LEDi_{sense}$ indicative of a current or voltage (e.g., sense current $i_{LEDsense}$) in controlled LED lighting system 700 and a target or reference signal $i_{target}(t)$, such as an analog or digital current or an analog or digital voltage provided from dimming strategy module 704. In the depicted timing diagram, sensed signal $LEDi_{sense}$ is, for example, the current $i_{LEDsense}$ sensed at the drain of FET Q1 going through resistor $R_{sense}$, as shown in FIG. 7, and the target current $i_{target}(t)$ is a target current $i_{TARGET}$ provided from dimming strategy module 704. Of course, in alternative embodiments, sensed signal $LEDi_{sense}$ and the target signal $i_{target}(t)$ may both be voltages.

While a control signal $C_{G1}$ supplied to the LED system (LEDs 102) is in a first state (e.g., such as an on-state), a polarity change in a comparison of the sensed signal $LEDi_{sense}$ and the target/reference signal $i_{target}(t)$ is detected at a first time. Based on the first time, a second time is determined at which to change a state of the control signal $C_{G1}$ supplied to the LED system (LEDs 102). At the determined second time, the state of the control signal $C_{G1}$ supplied to the LED system (LEDs 102) is changed from the first state to a second state (e.g., such as an off-state).

In FIG. 8, sensed signal $LEDi_{sense}$, which is either rising or falling at all times (e.g., polarity change), has repeating cycles of period P each comprising an interval T1 in which sensed signal $LEDi_{sense}$ is rising and an interval T2 in which sensed signal $LEDi_{sense}$ is falling. Each interval T1 in turn comprises an interval A (e.g., A(0), A(1), etc.) during which sensed signal $LEDi_{sense}$ rises from a cycle initial value (e.g., one state) to the target signal $i_{target}(t)$ and a subsequent interval B during which sensed signal $LEDi_{sense}$ rises from the target signal $i_{target}(t)$ to a cycle maximum value (e.g., another state). Sensed signal $LEDi_{sense}$ falls from the cycle maximum value to the initial value of the next cycle during interval T2. For clarity, intervals A and B are identified with ascending numerical cycle indices (A(0), A(1), etc. and B(0), B(1), etc.).

In accordance with the present invention, time-based dimming controller 707 or time-based current controller 709 can control FET $Q_1$ to implement any of a number of time-based control methodologies. For example, time-based dimming controller 707 or time-based current controller 709 can implement constant period control so that period P is constant (and intervals T1 and T2 vary between cycles), or constant on-time control so that interval T1 is constant (and period P and interval T2 vary between cycles), or constant off-time control so that interval T2 is constant (and period P and interval T1 vary between cycles). A desired methodology may be selected, for example, to reduce electromagnetic interference (EMI) with surrounding circuitry.

The simplest control methodology, which also enables an immediate lock to the target signal $i_{target}(t)$, is a constant on-time or constant off-time approach in which one of intervals T1 or T2 is of constant duration and the other interval (and period P) varies in duration. In a constant off-time control methodology, time-based dimming controller 707 or time-based current controller 709 controls FET $Q_1$ such that the interval A of interval T1 during which the sensed signal $LEDi_{sense}$ is less than the target signal $i_{target}(t)$ and the interval B of interval T1 during which the sensed signal $LEDi_{sense}$ is greater than the target signal $i_{target}(t)$ are equal. According to this constant off-time control methodology, the duration of interval B for each cycle is determined in accordance with the following equation 1:

$$B(N)=[B(N-1)+A(N)]/2, \quad \text{(Equation 1)}$$

where N is the cycle index. Thus, for example, utilizing Equation 1, time interval B(1) is equal to the average of time intervals B(0) and A(1). Interval T2 is, of course, fixed in duration.

The constant on-time control methodology employs the same equation as the constant off-time approach, except that in the constant on-time approach, interval T1 is of constant duration, interval A is the portion of interval T2 in which the sensed signal $LEDi_{sense}$ exceeds the target signal $i_{target}(t)$, and interval B is the portion of interval T2 in which the sensed signal $LEDi_{sense}$ is less than the target signal $i_{target}(t)$. Time-based current controller 709 again controls FET $Q_1$ such that intervals A and B are of equal duration.

Figure 9:
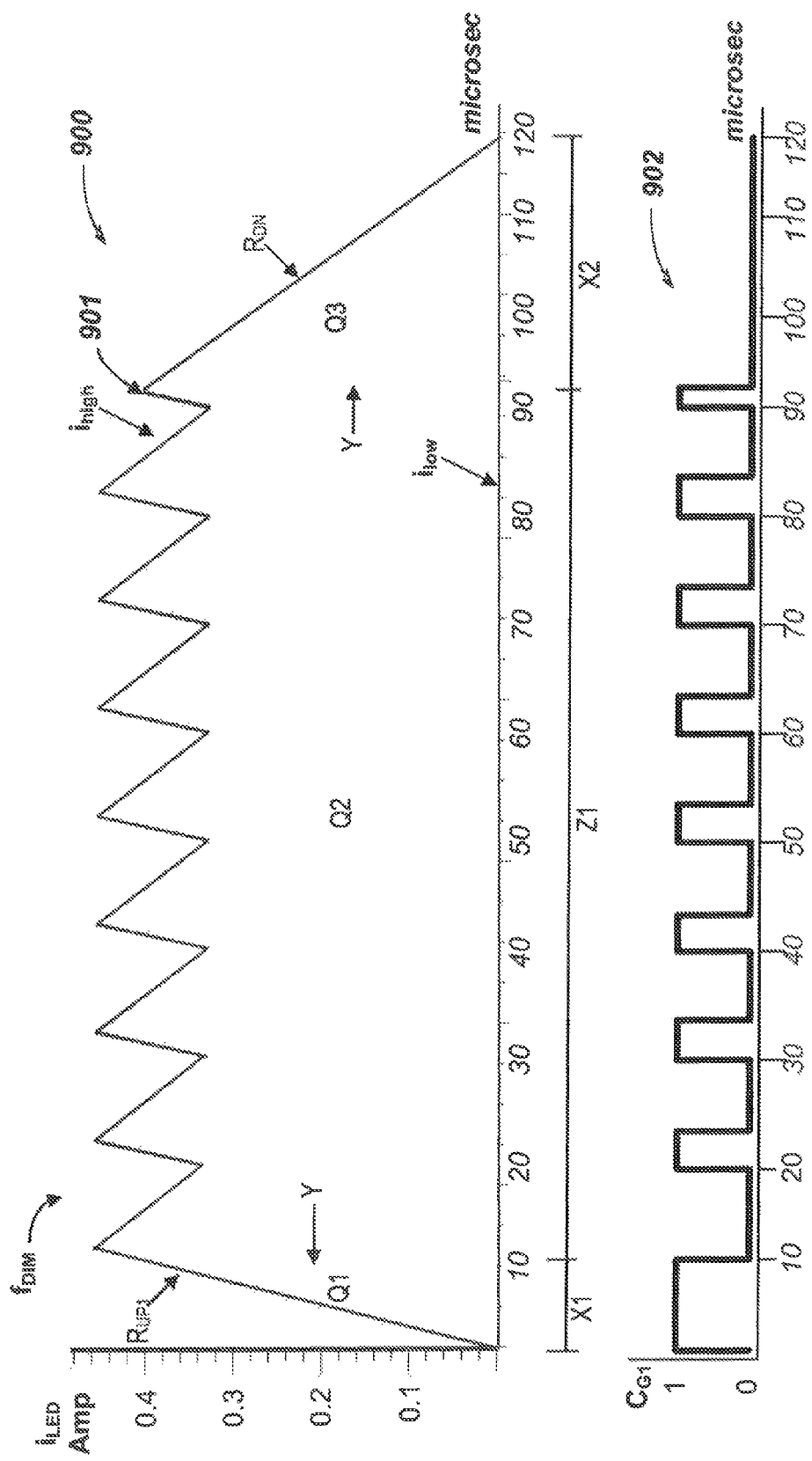
FIG. 9 depicts time plots showing a current active period of the LED current in which a Pulse Width Modulation (PWM) control signal controls the current levels of the LED current over the active time period of the LED current time period.

With reference now to FIG. 9, a current-time plot 900 and a control signal time plot 902 are shown. An LED current time period for an LED current $i_{LED}$ includes both active time periods and inactive time periods. An exemplary active time period of an LED current time period utilized by controlled lighting system 700 for dimming control is shown in current-time plot 900. A Pulse Width Modulation (PWM) switching control signal $C_{G1}$ is shown in control signal time plot 902 plotted over the same active period (e.g., from 0 to 120 microseconds). The PWM switching control signal $C_{G1}$ controls the current levels of the LED current $i_{LED}$ over the active time period for controlling the dimming levels of the LEDs 102. The active time period is generally defined as an LED current pulse (e.g., LED current pulse 901), that is, from when the current level of the LED current $i_{LED}$ ramps up to and fluctuates at an average high current value $i_{high}$ (e.g., 0.45 Amp) and through and until the time when the current level of the LED current $i_{LED}$ ramps down to a low current value $i_{low}$ (e.g., 0 Volts).

As shown in FIG. 9, the PWM switching frequency $f_{SW}$ for the PWM control signal $C_{G1}$ is different than the PWM dimming frequency rate $f_{DIM}$ for the LED current $i_{LED}$ for controlling dimming levels of LEDs 102 over time. Thus, for the operations of LED lighting system 700, two different PWM operating frequencies are respectively being utilized for the control signal $C_{G1}$ and the dimming control (e.g., control of the levels of LED current $i_{LED}$). Exemplary operating frequencies for PWM dimming frequency rate $f_{DIM}$ widely ranges from 100 Hz to 20 kHz. The PWM dimming frequency rate $f_{DIM}$ is provided by duty cycle modulating the LED current time period at a rate of greater than fifty (50) Hz. Exemplary operating frequencies for PWM switching frequency $f_{SW}$ range from 50 kHz to 250 kHz.

In FIG. 9, while control signal $C_{G1}$ turns on and has a high value (e.g., 1), LED current $i_{LED}$ ramps up during 0 microsec. to 12.5 microsec. in accordance to ramp-up slope $R_{UP1}$ and charges up to 0.45 Amp. When control signal $C_{G1}$ turns off and has a low value (e.g., 0), LED $i_{LED}$ starts decreasing from 0.45 Amp through 0.4 Amp and reaches 0.35 Amp at which point control signal $C_{G1}$ turns back on and has a high value (e.g., 1). The current level of LED current $i_{LED}$ continues to fluctuate in this manner (e.g., between 0.45 Amp and 0.35 Amp) in accordance with the pulses (e.g., turning on and off FET $Q_1$ of LED lighting system 700) of control signal $C_{G1}$. The fluctuations of the LED current level span from 12.5 microsec. through 92.5 microsec.

From 92.5 microsec. to 120 microsec., the current level of LED current $i_{LED}$ ramps down in accordance with ramp-down slope $R_{DN1}$ from 0.4 Amp to 0 Amp since control signal $C_{G1}$ is turned off and stays at 0. The actual charge amount $Q_{Actual}$ for LED current pulse 901 is calculated as follows:

$$Q_{Actual}=Q1+Q2-Q3 \quad \text{Equation 2}$$

The following charge amounts are determined by the following area calculations:

$$Q1=\frac{1}{2}*(X1*Y)=\frac{1}{2}*((12.5-0)*0.4)=2.5 \text{ μCoulombs} \quad \text{Equation 3}$$

$$Q2=Z1*Y=(92.5-12.5)*0.4=32 \text{ μCoulombs} \quad \text{Equation 4}$$

$$Q3=\frac{1}{2}*(X2*Y)=\frac{1}{2}*((120-92.5)*0.4)-5.5 \text{ μCoulombs} \quad \text{Equation 5}$$

Thus, the total actual charge amount $Q_{Actual}$ for LED current pulse 901 is:

$$Q_{Actual}=2.5+32+5.5=40 \text{ μCoulombs} \quad \text{Equation 6}$$

However, due to discrete limitations (e.g., discrete time/steps) of charge quantization, the total actual charge amount $Q_{Actual}$ for an active time period (e.g., LED current pulse 901) may differ from what a total desired charge amount $Q_{Desire}$ is. Thus, the total desired charge amount $Q_{Desire}$ that is desired to be delivered to LEDs 102 is calculated as follows:

$$Q_{Desire}=Q1+Q2+Q3+/-Q_{error} \quad \text{Equation 7}$$

The quantization error charge amount $Q_{error}$ may be a deficient charge amount or an excess charge amount depending on what the total desired charge amount $Q_{Desire}$ is relative to what the total actual charge amount $Q_{Actual}$ that can actually be delivered. If the quantization error charge amount $Q_{error}$ is a deficient charge amount, then the quantization error charge amount $Q_{error}$ is compensated by adding the equivalent charge amount in during a next or future time period (e.g., future LED current pulse) of LED current time period. For example, if the actual charge amount is 40 μCoulombs, but 41 μCoulombs is the desired charge amount $Q_{Desire}$ and cannot be achieved due to charge quantization limitations, then the quantization error charge amount $Q_{error}$ is a deficiency of 1 μCoulomb (e.g., $Q_{error}=Q_{Actual}-Q_{Desire}=40$ μCoulombs−41 μCoulombs=−1 μCoulomb). In this case, 1 μCoulomb is added in during a next of future time period to compensate the actual charge amount $Q_{Actual}$ for the desired charge amount $Q_{Desire}$. On the other hand, if the quantization error charge amount $Q_{error}$ is an excess charge amount, then the quantization error charge amount $Q_{error}$ is compensated by subtracting an equivalent charge amount from a next or future time period (e.g., future LED current pulse) of LED current time period. For example, if the actual charge amount is 40 µCoulombs, but 39 µCoulombs is the desired charge amount $Q_{Desire}$ and cannot be achieved due to charge quantization limitations, then the quantization error charge amount $Q_{error}$ is an excess amount of 1 µCoulomb (e.g., $Q_{error}=Q_{Actual}-Q_{Desire}=40$ µCoulombs−39 µCoulombs=+1 µCoulomb). In this case, 1 µCoulomb is subtracted from a next of future time period to compensate the actual charge amount $Q_{Actual}$ for the desired charge amount $Q_{Desire}$.

The process for modifying charge amounts delivered at a future time (e.g., modifying the charge amounts for future LED current pulses) as discussed for FIG. 9 can be appropriately repeated for subsequent LED current pulses. In the same manner for subsequent LED current pulses, charge amounts would be respectively compensated by adding to or subtracting from charge amounts of future LED current pulses depending upon whether the error charge amount is respectively a deficient or excess charge amount relative to the desired charge amount.

Figure 10:
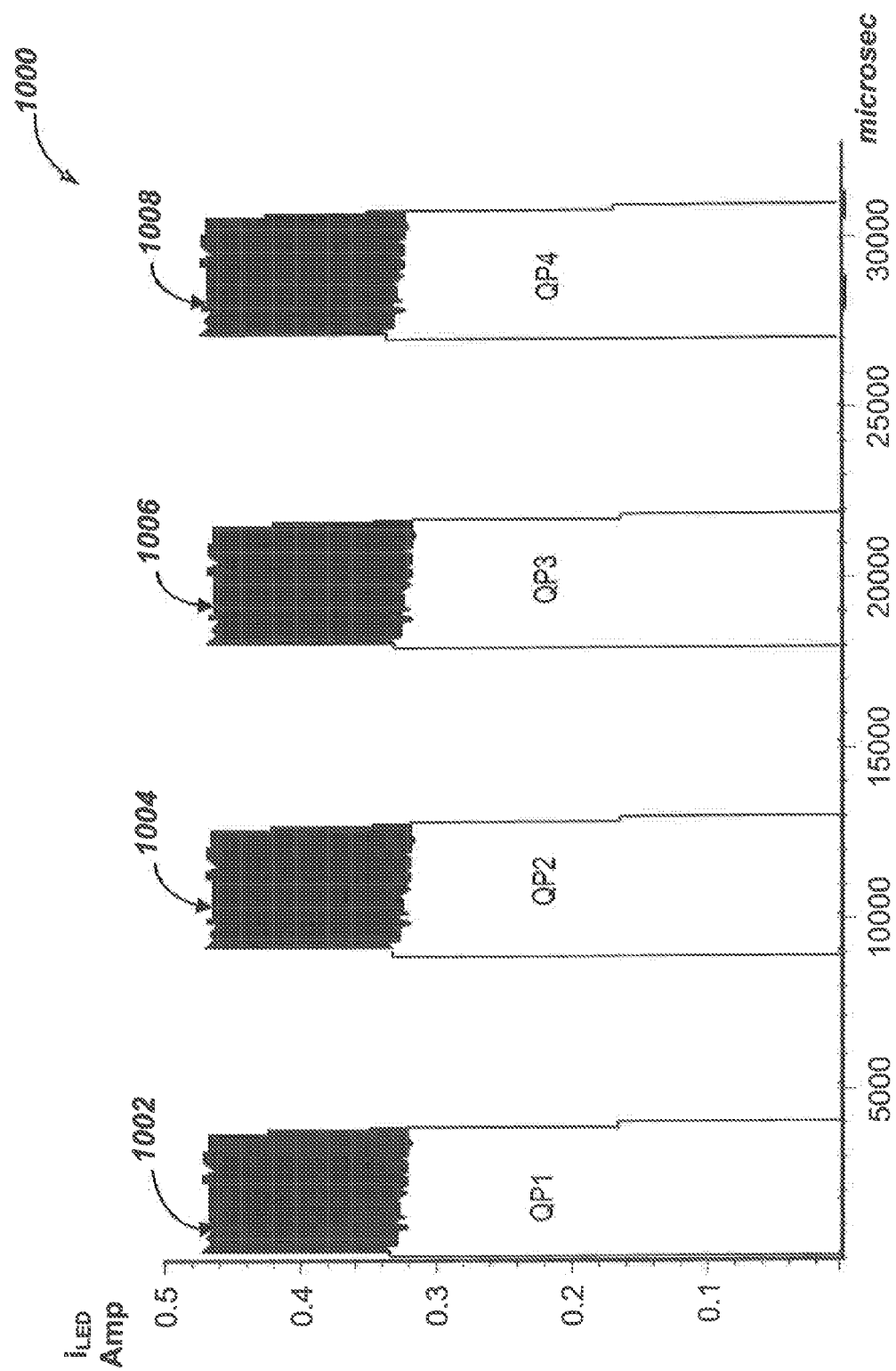
FIG. 10 depicts a time plot of LED current showing an exemplary train of active and inactive periods for the LED current controlled by a pulse width modulated dimming controller.

The dimming controller 707 can be a pulse width modulation (PWM) dimming controller or can be a delta-sigma dimming controller. Referring now to FIG. 10, a time plot 1000 of LED current shows an exemplary train of LED current pulses (e.g., current pulses 1002, 1004, 1006, and 108) that are indicative of active time periods of an LED current $i_{LED}$. The time plot 1000 also shows the inactive periods generally equally spaced apart between the LED current pulses since the dimming controller 707 is a pulse width modulated dimming controller. Error charge amounts that occur during an earlier active time period is compensated during a subsequent or future active time period. In other words, an error charge amount that occurs during current pulse 1002 is compensated during current pulse 1004, and an error charge amount occurring during current pulse 1004 is compensated during current pulse 1006. An error charge amount occurring during current pulse 1006 is compensated during current pulse 1008.

Figure 11:
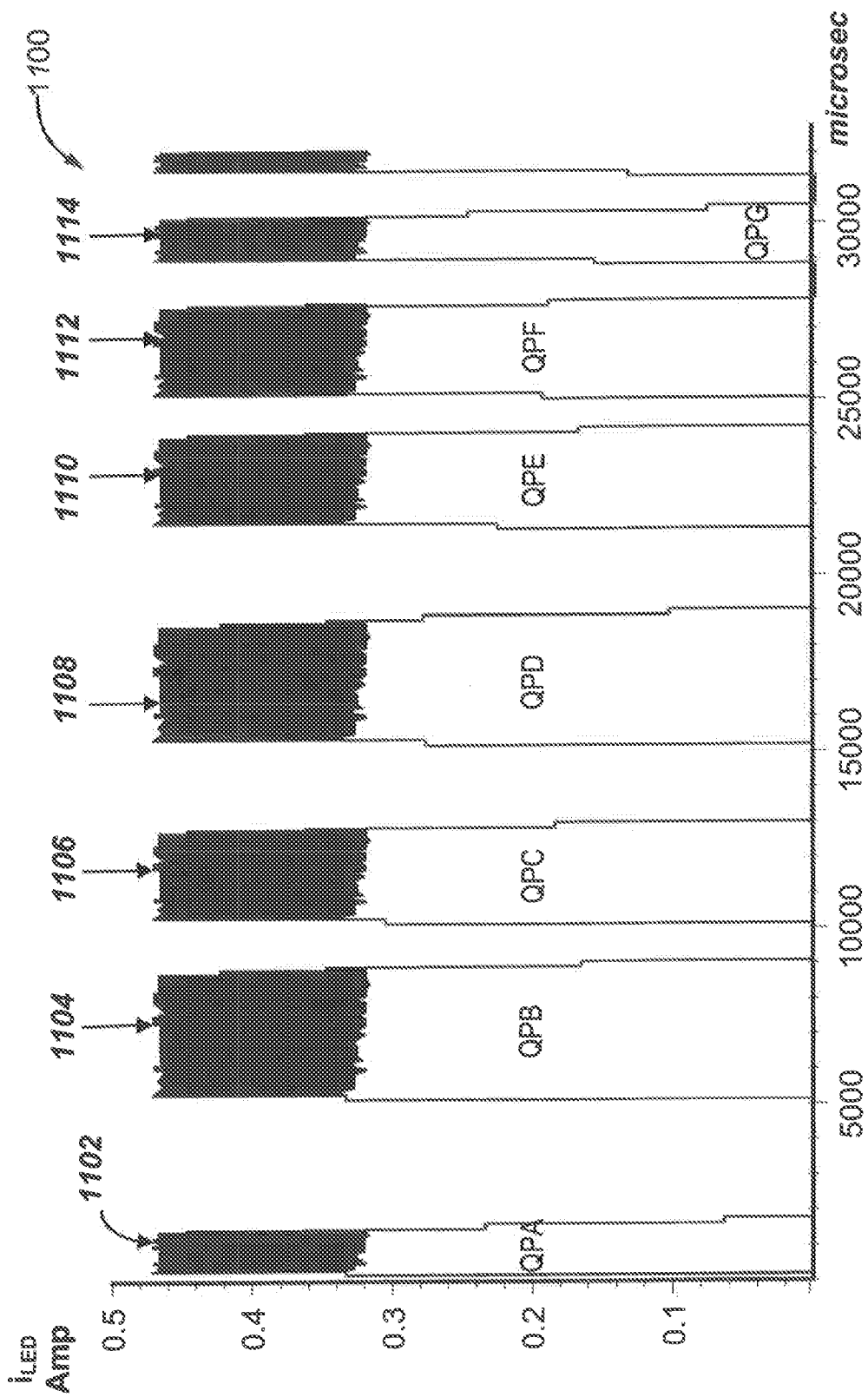
FIG. 11 depicts a time plot of LED current showing an exemplary train of active and inactive periods for the LED current controlled by a delta sigma modulated dimming controller.

Referring now to FIG. 11, a time plot 1100 of LED current shows an exemplary train of LED current pulses (e.g., current pulses 1102, 1104, 1106, 1108, 1110, 1112, 1114) that are indicative of active periods of an LED current $i_{LED}$. The time plot 1100 also shows the inactive periods non-uniformly spaced apart between the LED current pulses since the dimming controller 707 is a delta-sigma modulated dimming controller. Again, error charge amounts that occur during an earlier active time period is compensated during a subsequent or future active time period. In other words, an error charge amount that occurs during current pulse 1102 is compensated during current pulse 1104, and an error charge amount occurring during current pulse 1104 is compensated during current pulse 1106 and so on and so forth. As shown in FIG. 11, the pulses 1102, 1104, 1106, 1108, 1110, 1112, 1114 may be the same or different in duration and may or may not be generally uniformly spaced part.

The use of a delta-sigma modulated dimming controller 707 instead of a PWM dimming controller 707 for controlling the LED current $i_{LED}$ in FIG. 7 provides the characteristic of broadening the signal spectrum, which minimizes the potential for audible tones. A simple second order modulator, with reasonable dither level, may be implemented for the delta-sigma modulator, and such an implementation is generally sufficient and relatively inexpensive to implement. For example, the switching frequency $f_{SW}$ may be 200 kHz while the delta-sigma dimming frequency rate $f_{DIM}$ may be 20 kHz. In this case, a minimal chance for any audio noise production exists. However, a switching current control with rapid response, as it is turned on and off at a fast rate, is needed. Thus, a time-based dimming controller 707 and a time-based current controller 709 as discussed earlier for FIG. 7 provide such a fast switching response.

Thus, the actual charge amount delivered to the LEDs 102 is calculated and accumulated. The charge accumulation is compared to the desired charge amount. Modification and compensation of the total charge amount delivered to the LEDs 102 can be continuously and constantly performed, which can at least compensate for error charge amounts. Regardless of the characteristics of the start-up and start-down of the LED controller 706, the LED lighting system 700 will properly compensate and allows for a much faster PWM switching rate $f_{SW}$. Such a feature allows for smooth dimming of LEDs 102 by LED lighting system 700.

Exemplary pseudo-code for PWM operation of dimming control 707 is provided as follows:
Dim level D, 0-1
Qint charge accumulation, initialized to 0
PWM period PP
Full-scale current Itarget
Current control sample period PCC
Instantaneous LED current LEDI
At PP rate, Qint=Qint+D*Itarget
At PCC,
Qint=Qint−PCC*LEDI
If Qint>0, turn on LED controller
If Qint<=, turn off LED controller Although the present invention has been described in detail, it should be understood that various changes, substitutions and alterations can be made hereto without departing from the spirit and scope of the invention as defined by the appended claims.

What is claimed is:

1. A light emitting diode (LED) lighting system comprising:
a switching power supply for converting a phase modulated signal generated from a dimmer into an output voltage, wherein the dimmer is a phase cut dimmer and operates at a repetitive phase cut rate;
an LED controller coupled to the switching power supply; and
light emitting diodes (LEDs) coupled to the LED controller; and
wherein the LED controller controls a current of the LEDs and includes components to: calculate, based on the current of the switching power supply, an average current amount delivered to the LEDs in a time period, wherein the time period is based on the repetitive phase cut rate; and utilize an actual charge based on the current to modify a future switching timing of the switching power supply.

2. The LED lighting system of claim 1 wherein the LED controller controls dimming of the LEDs.

3. The LED lighting system of claim 2 wherein the LED controller controls dimming of the LED system over a wide dimming frequency range.

4. The LED lighting system of claim 1 further comprising: components to utilize the actual charge based on the current to modify the future switching timing of the switching power supply.

5. The LED lighting system of claim 4 wherein the components to utilize the actual charge further comprises: components to compare the actual charge amount to a desired charge amount for an active time period and compensate for a difference between the actual charge amount and the desired charge amount during a future active time period.

6. The LED lighting system of claim 5 wherein the desired target charge is based on phase delays in a rectified input voltage.

7. The LED lighting system of claim 5 wherein the active time period and the future active time period are based on an averaging period that is based on the repetitive phase cut rate.

8. The LED lighting system of claim 7 wherein the LED controller controls dimming of the LEDs.

9. The LED lighting system of claim 8 wherein the LED controller comprises a dimming controller and a current controller wherein the dimming controller drives the current controller.

10. The LED lighting system of claim 9 wherein the dimming controller is driven by the repetitive phase cut rate and the current controller is driven by a switching frequency rate and wherein the repetitive phase cut rate is different than the switching frequency rate.

11. A method for controlling a current in light emitting diodes (LEDs) of an LED lighting system, comprising:
converting, by a switching power supply, a phase modulated signal generated from a dimmer into an output voltage, wherein the dimmer is a phase cut dimmer and operates at a repetitive phase cut rate;
controlling, by the LED controller coupled to the switching power supply and the light emitting diodes, a current of the LEDs;
calculating, by the LED controller, based on the current of the switching power supply, an average current amount delivered to the LEDs in a time period, wherein the time period is based on the repetitive phase cut rate; and
utilizing, by the LED controller, the actual charge based on the current to modify a future switching timing of the switching power supply.

12. The method of claim 11 wherein controlling, by the LED controller coupled to the switching power supply and the light emitting diodes, a current of the LEDs further comprises: controlling, by the LED controller, dimming of the LEDs.

13. The method of claim 12 wherein controlling, by the LED controller, dimming of the LEDs further comprises: controlling, by the LED controller, dimming of the LEDs over a wide dimming frequency range.

14. The method of claim 11 further comprising: utilizing, by components, the actual charge based on the current to modify the future switching timing of the switching power supply.

15. The method of claim 14 further comprises: comparing, by components, the actual charge amount to a desired charge amount for an active time period; and compensating, by the components, for a difference between the actual charge amount and the desired charge amount during a future active time period.

16. The method of claim 15 wherein the desired target charge is based on phase delays in a rectified input voltage.

17. The method of claim 15 wherein the active time period and the future active time period are based on an averaging period that is based on the repetitive phase cut rate.

18. The method of claim 11 wherein utilizing, by the LED controller, the actual charge to modify and provide a desired target charge amount to be delivered further comprises: utilizing the actual charge to modify and provide the desired target charge amount to be delivered during the future active time period of the LED current time period, wherein the future active time period is based on the repetitive phase cut rate further comprises; comparing the actual charge amount to a desired charge amount for the active time period; and compensating for a difference between the actual charge amount and the desired charge amount during the future active time period.

19. The method of claim 18 wherein controlling, by the LED controller coupled to the switching power supply and the light emitting diodes, a current, further comprises: controlling, by the LED controller, dimming of the LEDs.

20. The method of claim 19 wherein the LED controller comprises a dimming controller and a current controller and further comprising: driving, by the dimming controller, the current controller.

21. The method of claim 20 wherein driving, by the dimming controller, the current controller further comprises: driving the dimming controller at the repetitive phase cut rate; and driving the current controller at a switching frequency rate that is different than the repetitive phase cut rate.

* * * * *